UNITED STATES PATENT OFFICE.

FREDERICK KLEIN, OF NEW YORK, N. Y.

NITROSULPHONE OF SELENIUM.

1,412,873.  Specification of Letters Patent.  Patented Apr. 18, 1922.

No Drawing.  Application filed November 19, 1921. Serial No. 516,353.

*To all whom it may concern:*

Be it known that I, FREDERICK KLEIN, a citizen of the United States, and a resident of New York city, borough of Bronx, in the county of Bronx and State of New York, have invented certain new and useful Improvements in Nitrosulphone of Selenium, of which the following is a specification.

The object of my invention is to provide a new and improved selenium product for use in the medicinal practice and which is particularly adapted for prevention and care of carcinoma and other malignant growths.

In order to produce this new chemical preparation which is nitro sulphone of selenium, I treat selenius acid to obtain red amorphous selenium which is treated with nitric acid for the production of crystals of nitro selenius acid. This nitro selenius acid is then treated with sulphurous acid gas until a nitro sulphone of selenium is formed which is then neutralized by means of a suitable base and as a resultant thereof a nitro sulphone of selenium is obtained which is adapted for medicinal purposes and which consists of fine white crystals; is soluble in water; is less soluble in alcohol than in water; and is still less soluble in ether than in alcohol; has a bitter astringent acid taste and in doses of one or two milligrams is non-toxic.

For the purpose of producing this nitro sulphone of selenium in a pure state for medicinal purposes I may proceed as follows:—

Two hundred grams of metalloid black modification of selenium are mixed and treated with eight hundred and sixty cubic centimeters or twelve hundred grams of concentrated nitric acid. By the reaction taking place, red fumes of nitrogen dioxide are formed in abundance. This reaction is permitted to continue until no further nitrogen dioxide fumes pass off. The mixture is then heated on a sand bath until a crystallized mass is obtained which is of a yellowish white color. This mass is dissolved in water and animal charcoal is added and the mixture is filtered. The filtrate is evaporated on a sand bath. The result is a crystallized compact mass of pure selenius acid. This pure selenius acid is then heated in a porcelain vessel on a sand bath until red amorphous selenium is obtained. This red amorphous selenium is then treated with one hundred and twenty grams of concentrated nitric acid and stirred while the reaction takes place, which reaction produces highly poisonous fumes. The stirring and heating are continued until fumes are no longer produced. Then the mixture is evaporated in a sand bath until long white crystals are formed, which crystals consist of pure nitro selenius acid. They are less soluble in water than the selenius acid crystals, but all their other reactions are similar to those of selenius acid but it should be noted that the nitro selenius acid is a much more stable chemical compound than the selenius acid.

This nitro selenius acid is then decomposed by sulphurous acid gas (sulphurdioxide gas) by dissolving the nitro selenius acid in water at a temperature of about 65 degrees F (more or less) and then conducting the sulphur-dioxide gas into this solution whereby an alpha and beta red selenium compound is produced which however begins to turn black at once. The remaining clear liquid contains colloidal sulphone selenium. After the amorphous percipitates above mentioned have been filtered off from the solution the liquor is neutralized by means of a suitable organic or inorganic base, for example potassium carbonate or preferably potassium bi-carbonate. This neutralized solution is then evaporated under low atmospheric pressure, that is under a pressure less than atmospheric pressure. The resultant is a potassium sulphone selenium nitrogen compound or colloidal nitro sulphone of selenium. This nitro sulphone of selenium is mixed with other more or less neutral or inert bases for use in the treatment of carcinoma and other similar diseases.

Having described my invention what I claim as new and desire to secure by Letters Patent is:—

The chemical product, nitro sulphone of selenium herein described, consisting of a white fine crystal hygroscopic salt, which is less soluble in alcohol than in water and still less soluble in ether than in alcohol; has a bitter astringent acid taste and in doses of one or two milligrams is non-toxic, substantially as set forth.

Signed at the borough of Manhattan, in the county of New York and State of New York, this 28th day of July, A. D. 1914.

FREDERICK KLEIN.

Witnesses:
 JUL. GOTTL. SATTLER,
 GUSTAV LAWLER.